Sept. 28, 1965        W. E. BELL        3,209,242
GYROMAGNETIC RESONANCE METHODS AND APPARATUS
Original Filed Aug. 9, 1956
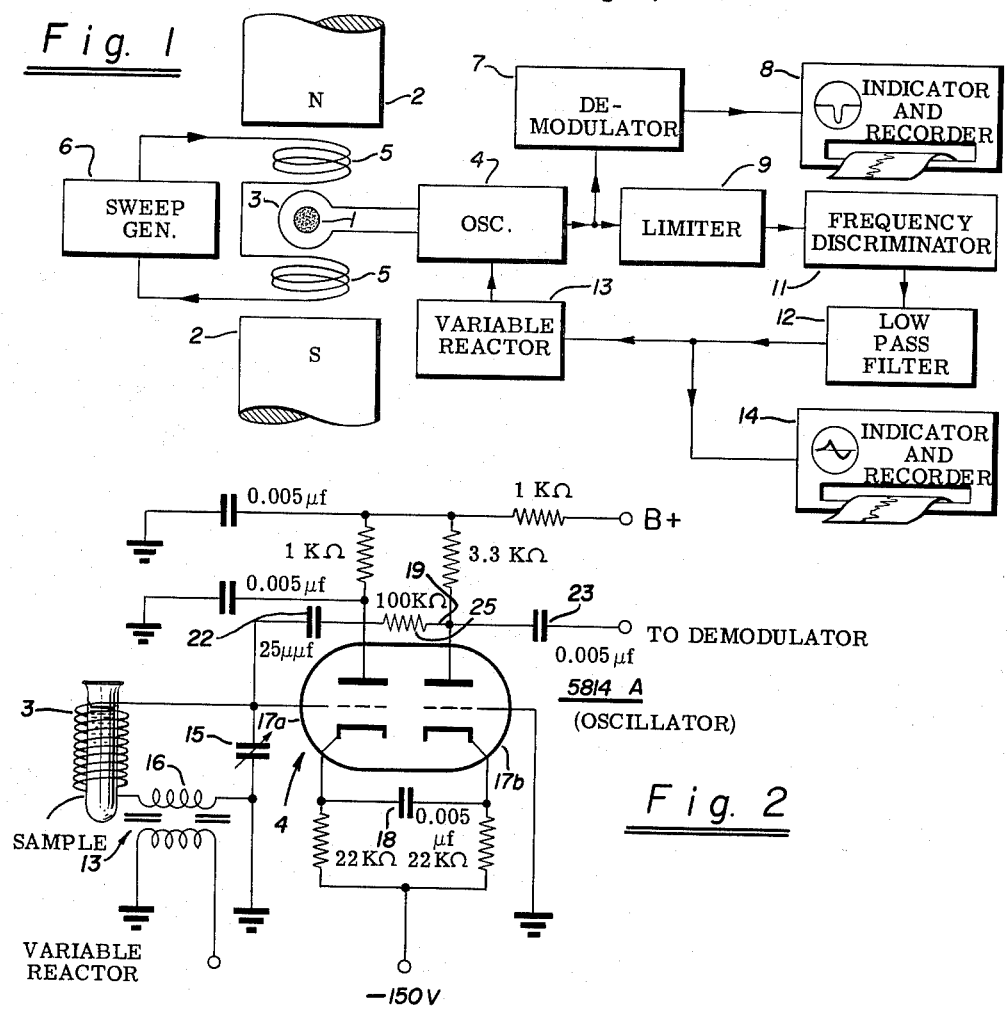
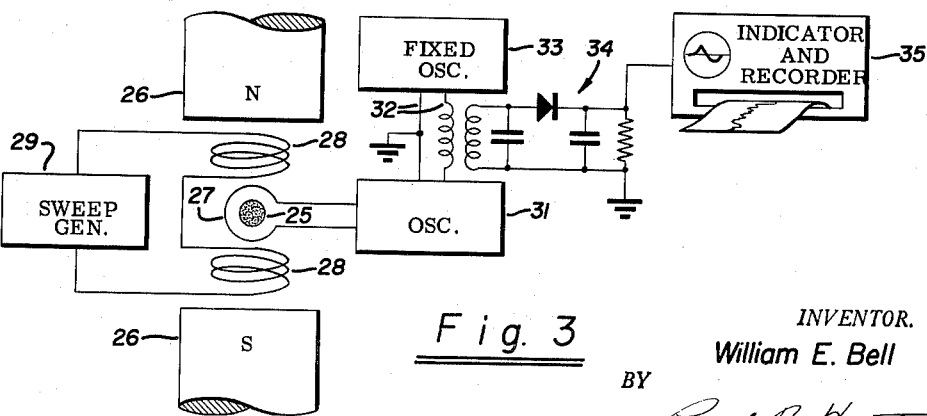
INVENTOR.
William E. Bell
BY
Paul B. Hunter
Attorney

United States Patent Office 3,209,242
Patented Sept. 28, 1965

3,209,242
GYROMAGNETIC RESONANCE METHODS AND APPARATUS
William E. Bell, Palo Alto, Calif., assignor to Varian Associates, San Carlos, Calif., a corporation of California
Continuation of application Ser. No. 604,295, Aug. 9, 1956. This application Mar. 18, 1963, Ser. No. 265,989
27 Claims. (Cl. 324—.5)

The present application is a continuation application of U.S. Serial No. 604,295 filed August 9, 1956, and assigned to a common assignee. The parent application has been abandoned in favor of the present application.

The present invention relates in general to gyromagnetic resonance methods and apparatus and more specifically to novel improved methods and apparatus for detecting and displaying gyromagnetic resonance. The present invention is extremely useful in that it provides a method and means whereby a single device may be utilized for inducing and detecting gyromagnetic resonance of a sample of matter and at the same time achieving extremely high resolution of the gyromagnetic resonance signals.

Heretofore, gyromagnetic resonance detection systems have been built utilizing oscillating detector principles, that is, a system wherein the energy absorbed from an oscillator is reflected as a change in the amplitude of oscillation or a change in the phase of the oscillation, such changes then being indicated and recorded to indicate resonance of the gyromagnetic sample. However, these prior art devices have failed to achieve high resolution due to uncontrollable random fluctuations and drift in the frequency and the amplitude of the oscillations.

The present invention provides method and apparatus for stabilizing the oscillator such that the random fluctuations and drift of amplitude and frequency are minimized, thereby allowing and providing extremely high resolution of the gyromagnetic resonance signals.

The principal object of the present invention is to provide novel improved gyromagnetic resonance methods and apparatus whereby the relatively simple oscillating detector system may be utilized to observe gyromagnetic resonance with extreme stability.

One feature of the present invention is the provision of an extremely stable frequency source, associated with the oscillating detector device, for controlling and stabilizing the frequency thereof.

Another feature of the present invention is the provision of an extremely stable frequency means providing a frequency standard for comparison with the frequency of oscillation of the oscillating detector device whereby a control signal is derived to correct the frequency of the oscillating detector.

Another feature of the present invention is the provision of novel methods and apparatus for detecting gyromagnetic resonance whereby both the absorption and dispersion characteristics of resonance may be simultaneously observed.

Another feature of the present invention is the provision of a variable reactor means coupled to the oscillator means and controlled by a signal from the stable frequency means for stabilizing the frequency of the oscillator detector means.

Another feature of the present invention is the provision of a novel oscillating detector which will give linear detection of gyromagnetic resonance and which is relatively immune to lower frequency noise signals.

These and other features and advantages of the present invention will be more apparent after a perusal of the following specification taken in connection with the accompanying drawings wherein, FIG. 1 is a schematic block diagram of a novel gyromagnetic resonance detection system embodying the present invention, FIG. 2 is a circuit diagram of a portion of the system of FIG. 1, and FIG. 3 is a schematic block diagram of another gyromagnetic resonance detection system embodying the present invention.

A description of the novel system embodying the present invention, as illustrated in the block diagram of FIG. 1, will first be made followed by a more detailed description of that portion of the system as is shown in the succeeding circuit diagram.

Referring now to FIG. 1 there is shown in block diagram form one embodiment of the present invention. A sample of matter 1 which is under analysis is placed within a strong D.C. polarizing magnetic field produced, for example, by magnet 2. An R.F. coil 3 is positioned surrounding the sample of matter 1 with its longitudinal axis perpendicular to the D.C. magnetic flux lines of the polarizing field and forms the inductive portion of a tank circuit for an oscillator 4.

A sweep coil 5 is positioned straddling the sample of matter 1 and in operation serves to superimpose upon the D.C. magnetic field a small cyclically varying magnetic field for modulating the polarizing magnetic field produced by magnet 2. A sweep generator 6 provides the low frequency current to drive the sweep coils 5.

In operation the oscillator 4 is tuned to a fixed frequency, for example 30 megacycles, and put into operation. The polarizing magnetic field produced by magnet 2 which may be, for example, an electromagnet is adjusted in intensity until its value is in the vicinity of that value which is necessary to produce resonance of the sample of matter at an applied radio frequency of 30 megacycles. The sweep generator 6 then cyclically varies the magnetic field intensity to produce successive resonance of the gyromagnetic bodies, if any, within the sample of matter 1.

When the gyromagnetic bodies within the sample of matter 1 pass through resonance they will present to the oscillator 4, in succession, before resonance, a reactive impedance; at resonance, a purely resistive impedance; and then as resonance is passed, a reactive impedance of the opposite sign than first encountered. The effect of this changing impedance, due to the resonance of the sample, on oscillator 4 is to, when the impedance is reactive, pull the frequency of the oscillator 4 either up or down in frequency depending upon whether the impedance of the gyromagnetic sample appears capacitive or inductive. Precisely at resonance the impedance is predominately resistive thereby lowering the Q of the tank or frequency determinative circuit of oscillator 4 and accordingly the amplitude of oscillation. Thus, it can be seen as the sweep generator sweeps the magnetic field through resonance the amplitude of oscillator 4 will be modulated.

This amplitude modulation is removed from the R.F. signal by demodulator 7 and fed to an indicator and recorder 8 to be recorded as a function of sweep generator sweep or time as desired. The low frequency signal indicated and recorded in indicator and recorder 8 arising from the resistive characteristic of the sample of matter at resonance is referred to as the absorption signal.

For high resolution spectroscopy it is necessary that the oscillator 4 remain substantially fixed at a given frequency. This is immediately apparent when one considers the numbers involved. For example, the bandwidth of the resonance of a particular gyromagnetic sample disposed within the polarizing field of approximately 7,000 gauss at a resonance frequency of approximately 30 megacycles may well be between 1 and 3 cycles.

Thus, it is very important that the oscillator frequency not vary a cycle or a fraction of a cycle per second during the time required to sweep through the gyromagnetic spectrum of the sample 1.

Considering the reactive effects of the sample tending to detune the oscillator 4 it can be readily appreciated that for high resolution work some means must be provided for holding the frequency of the oscillator 4 constant. Accordingly, a portion of the R.F. output of oscillator 4 is fed to a limiter 9 wherein the signal is limited in amplitude and then applied to a frequency discriminator 11.

The frequency discriminator 11 must be able to discriminate a cycle or a fraction of a cycle at 30 megacycles. A carefully designed crystal controlled frequency discriminator is capable of obtaining the necessary discrimination. Such a discriminator is taught by John Ruston in an article titled "A Simple Crystal Discriminator for F.M. Oscillator Stabilization," appearing in the Proc. IRE, of July 1951, pages 783–788. The output of the frequency discriminator 11 will be of a very low frequency or D.C. signal, the magnitude and phase of which is proportional to the degree and sense respectively that the frequency of oscillator 4 varies from the preselected fixed reference value designed into the frequency discriminator 11.

The output of frequency discriminator 11 is then fed to a low pass filter 12 wherein extraneously induced higher frequency signals are eliminated. The low frequency signal is then fed to a variable reactor 13 which is coupled into the oscillator 4 in such a manner as to vary the frequency of the oscillator 4 to keep it precisely at the frequency as determined by the frequency discriminator 11.

As the magnetic polarizing field is swept through resonance a gyromagnetic sample of matter 1 will first present a certain reactive impedance to oscillator 4 and then on the opposite side of resonance the sample will present the complementary reactive impedance. These impedance changes due to the resonance of the sample tend to detune the oscillator 4. Thus, the frequency discriminator 11 will produce D.C. or low frequency signals which are fed to the variable reactor to balance out the reactive effects due to the sample 1.

On one side of resonance the D.C. control signal will have a certain magnitude and phase and on the opposite side of resonance it will have equal magnitude but opposite phase. This amplitude change and phase shift of the D.C. control signal as the sample passes through resonance is indicative of the reactive characteristic of the sample and is known in the art as the dispersive characteristic. The low frequency output of frequency discriminator 11 varies in accordance with the dispersive characteristic of the sample and thus is known as the dispersive signal. The dispersive signal is applied to an indicator and recorder 14 to allow observation of the dispersive characteristic of the sample 1.

Although in a preferred embodiment of the present invention, shown in FIG. 1, a separate limiter 9 has been shown and described, a separate limiter is not required if one is willing to sacrifice some of the sensitivity of the absorption signal. More specifically, the oscillator 4 may be operated at a saturated state thereby achieving the limiting function without a separate limiter means. In addition, low pass filter 12 may be eliminated at the expense of a small amount of noise in the dispersion signal.

Referring now to FIG. 2 there is shown a circuit diagram of the oscillator 4 including the tuned tank or frequency determinative circuit. The sample of matter 1 is disposed within the R.F. coil 3 which together with a variable capacitor 15 and a variable inductor 16 forms the tank or frequency determinative circuit of oscillator 4. The tank circuit is tuned to the standard frequency as determined by the crystal of the frequency discriminator 11. In operation slight adjustments in the tuning of the tank circuit are accomplished by changing the effective inductance of the tank circuit through the intermediary of the variable reactor 13.

The oscillator 4 comprises a double triode having the output of the tank circuit connected to the grid of the first triode 17a which is connected as a cathode follower. The R.F. output of the cathode follower 17a is coupled by a coupling capacitor 18 to the cathode of the second triode amplifier 17b. The output of the second triode is taken from the plate circuit thereof via lead 19 through attenuating resistor 25 and coupling capacitor 22 back to the tank circuit. A suitable tube for the oscillator 4 is, for example a 5814A. A second coupling capacitor 23 in the plate circuit of the oscillator couples the amplified R.F. signal to the demodulator 7. Representative values of the various elements used in a typical oscillator circuit, operating at 3 mc., are as shown in the drawings (FIG. 2).

The coupling capacitor 18 which serves to couple the output of the cathode follower 17a to the input of the second triode 17b is designed to pass only the higher frequency signals or the tuned circuit resonance frequency. In this manner extraneously induced lower frequency perturbations detected by the tuned circuit or otherwise appearing in the output of cathode follower 17a are strongly attenuated by capacitor 18 and thus are substantially not propagated to the input of triode amplifier 17b.

Referring now to FIG. 3 there is shown another embodiment of the present invention. A sample of matter 25 which it is desired to analyze is placed within a strong D.C. polarizing magnetic field produced by magnet 26. An R.F. coil 27 is positioned surrounding the sample of matter with its longitudinal axis at right angles to the flux lines of the polarizing field. A pair of sweep coils 28 are positioned straddling the sample of matter 25. The axis of the sweep coils 28 are in alignment with the D.C. polarizing field such as to facilitate modulation thereof. A sweep generator 29 applies a low frequency cyclically varying energizing current to sweep coils 28.

The R.F. coil 27 forms the inductive portion of a tuned tank circuit of an oscillator 31. Oscillator 31 may be of the type that is shown and described in FIGS. 1 and 2 above. The tank circuit of oscillator 31 is coupled by a transmission line 32 to the output of a fixed frequency oscillator 33 such as, for example, a stable crystal-controlled oscillator. A diode detector 34 is coupled as by, for example, inductive coupling to the transmission line 32 interconnecting the oscillators 31 and 33. The output of diode detector 34 is fed to an indicator and recorder 35 for indicating the circulating currents present on transmission line 32.

In operation, the fixed oscillator 33 is tuned to a fixed frequency such as, for example, 30 megacycles. Oscillator 31 is tuned to the same frequency as the fixed oscillator 33. The intensity of the D.C. polarizing magnetic field produced by magnet 26 is selected to be within the vicinity of resonance of the gyromagnetic sample 25 at the fixed frequency of oscillator 31. A modulation of the D.C. polarizing field intensity is achieved by superimposing a small cyclically varying biasing field produced by sweep coils 28 and sweep generator 29 upon the D.C. polarizing field.

Modulation of the D.C. polarizing magnetic field intensity produces successive resonance of the gyromagnetic bodies within the sample of matter 25. Due to the coupling between oscillators 31 and 33 via transmission line 32, oscillator 31 will tend to oscillate in phase and at the same frequency as fixed frequency oscillator 33. When oscillators 31 and 33 are in phase their amplitudes are selected to be slightly unequal and therefore there will be produced a voltage drop at the R.F. frequency across the inductive coupler present in transmission line 32. A corresponding constant amplitude R.F. signal will be produced in the secondary of the inductive coupler which is the input to the diode detector 34. The R.F. signal will be rectified in diode detector 34 and will produce a steady D.C. signal in the input to indicator and recorder 35.

As gyromagnetic resonance is approached in sample 25 there will be produced an additional reactive impedance component, due to the sample, in the tank circuit of oscillator 31. This reactive component will tend to detune oscillator 31. However, due to the close coupling between oscillator 31 and fixed oscillator 33 via transmission line 32 before oscillator 31 can vary in frequency it must pull the frequency fixed oscillator 33 with it. However, fixed oscillator 33 will not be detuned, that is, it cannot be pulled off frequency by oscillator 31. Thus, balancing reactive currents will flow between oscillator 31 and 33 in transmission line 32 to balance out the reactive effects of the sample 25 near resonance. These reactive currents are at the R.F. frequency of fixed oscillator and are superimposed upon the existing R.F. voltage drop across the inductor of transmission line 32.

The circulating R.F. currents will then be detected in diode detector 34 and manifested as an increase or decrease in the D.C. level in the output of diode detector 34 which is then indicated and recorded on indicator and recorder 35. Since the circulating currents which flow in transmission line 32 near resonance of the gyromagnetic sample 25 are a function of the reactive effects of the sample 25 they are a measure of the dispersive characteristics of the sample and accordingly will have the characteristic dispersive line shape.

Oscillator 31 may take the same form as the oscillator 4 of FIG. 1 shown in greater detail in FIG. 2. Fixed frequency oscillator 33 may be any extremely stable oscillator such as, for example, a stable crystal-controlled oscillator. Although the diode detector 34 is shown inductively coupled to the transmission line 32 other forms of coupling such as, for example, capacitive coupling could also be used. In addition other demodulators could be used instead of a diode detector 34.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method of producing stable gyromagnetic resonance of a sample of matter disposed within a polarizing field region comprising the steps of producing gyromagnetic resonance of a sample of matter which is electromagnetically closely coupled to the frequency determinative resonant circuit of an R.F. oscillator means, such that resonance effects of the sample substantially tend to pull the frequency of said oscillator means sampling a first R.F. resonance output frequency signal of the oscillator means, comparing a first R.F. resonance output frequency signal with a second R.F. fixed standard frequency, said standard frequency being independent of said R.F. oscillator and said gyromagnetic resonance sample of matter deriving an electrical control signal from the comparison of the first and second R.F. frequencies for stabilizing the frequency of said oscillator means against said sample pulling effect and applying the control signal to the oscillator for maintaining the frequency thereof at the desired frequency and monitoring the resonance whereby random fluctuations in the oscillation of the oscillator are minimized in use thereby enhancing stable gyromagnetic resonance.

2. The method according to claim 1 wherein the step of comparing the first R.F. resonance output frequency signal with the second R.F. standard frequency comprises the step of applying the output resonance frequency signal to a stable fixed frequency discriminator.

3. The method according to claim 2 wherein the step of deriving a control signal for stabilizing the oscillator comprises the step of deriving a low frequency signal, the phase and magnitude of which is a function of the sense and degree to which the frequency of the R.F. oscillator tends to vary from the R.F. standard frequency.

4. The method according to claim 1 wherein the step of applying the control signal to the oscillator comprises the step of varying the inductance of the frequency determinative circuit of the oscillator in variable accordance with the control signal.

5. The method of observing stable gyromagnetic resonance of a sample of matter disposed within a polarizing field region by observing the affect of the resonating gyromagnetic bodies upon an oscillator comprising the steps of producing gyromagnetic resonance of a sample of matter closely coupled to the frequency determinative resonant circuit of the oscillator, such that resonance effects of said sample substantially tend to pull the frequency of said oscillator comparing the output R.F. frequency of the oscillator with a standard R.F. fixed frequency, deriving an electrical control signal for stabilizing the oscillator, applying the control signal to the oscillator for maintaining the frequency at the desired frequency, and measuring the control signal as a function of time to obtain a measure of the dispersive characteristics of the gyromagnetic sample near resonance.

6. The method of observing stable gyromagnetic resonance of a sample of matter disposed within a polarizing field region by observing the affect of the resonating gyromagnetic bodies upon an oscillator means comprising the steps of producing gyromagnetic resonance of a sample of matter closely coupled to the frequency determinative resonant circuit of the oscillator means such that resonance effects of said sample substantially tend to pull the frequency of said oscillator, comparing the output R.F. frequency signal of the oscillator means with a standard R.F. fixed frequency, said standard frequency being independent of the R.F. oscillator and the gyromagnetic resonance sample of matter, deriving in electrical control signal for stabilizing the oscillator, applying the control signal to the oscillator for maintaining the R.F. output frequency at the desired frequency signal, and measuring the fluctuations in the amplitude of oscillation of the oscillator means in the vicinity of resonance to obtain a measure of the absorption characteristics of the gyromagnetic sample of matter.

7. Apparatus for producing stable gyromagnetic resonance of a sample of matter disposed within a polarizing field region comprising, an oscillator means having its frequency determinative resonant circuit closely coupled to the gyromagnetic resonance of the sample, such that resonance effects of the sample substantially tend to pull the frequency of said oscillator means, means forming an R.F. fixed frequency standard independent of the R.F. oscillator and the gyromagnetic resonance sample of matter, means for comparing the R.F. oscillations of the oscillator to be the preselected R.F. standard frequency to obtain an electrical control signal for controlling the oscillations of the oscillator, and means for applying the control signal to said oscillator means for correcting and stabilizing the R.F. oscillations thereof, and means for monitoring the resonance, thereby enhancing the stability of gyromagnetic resonance by minimizing random fluctuations in the oscillations of the oscillator means.

8. Apparatus as claimed in claim 7 including a sweep means for cyclically varying the conditions necessary for gyromagnetic resonance to thereby obtain successive gyromagnetic resonances of the gyromagnetic bodies within the sample of matter.

9. Apparatus according to claim 7 wherein said monitoring means include a demodulator means coupled to said oscillator means for obtaining a signal in variable accordance with low frequency amplitude fluctuations of said oscillator means, and indicator means for indicating the low frequency amplitude fluctuations to thereby obtain an indication of the absorption characteristics of the sample of matter.

10. An apparatus as claimed in claim 7 wherein said means for applying the control signals to said oscillator means comprises a transmission line means.

11. Apparatus according to claim 8 including indicator means for indicating the control signals to thereby obtain a measure of the dispersive characteristics of the sample of matter.

12. Apparatus according to claim 10 wherein said monitoring means includes, demodulator means coupled to said transmission line means for detecting the low frequency fluctuations in the control signals, and indicator means for displaying the magnitude and phase of the low frequency fluctuations of the control signals.

13. An apparatus as claimed in claim 11 wherein said R.F. frequency standard means comprises a frequency discriminator means, and said means for applying the control signals to said oscillator comprises a variable reactor means.

14. Oscillator apparatus for producing stable gyromagnetic resonance of a sample of matter disposed within a polarizing magnetic field region comprising: a high Q resonator circuit resonant at the gyromagnetic resonance frequency of said sample in said field, said sample being electromagnetically closely coupled to said high Q resonant circuit, cathode follower means including a cathode, a control grid and a plate electrode, said cathode follower means having an input terminal thereof coupled to said resonator circuit, amplifier means including its own separate cathode, control grid and plate electrode, circuit means coupling the output of said cathode follower means to the input of said amplifier means, said circuit means including means for passing essentially only frequencies at said gyromagnetic resonance frequency and for rejecting direct current and lower frequencies whereby low frequency perturbations are not coupled from said cathode follower output to said amplifier means, and feedback means for feeding back a portion of the output signal of said amplifier to said cathode follower means in the proper phase to produce sustained oscillation of the oscillator apparatus at said gyromagnetic resonance frequency.

15. Apparatus as claimed in claim 14 including variable inductive means coupled to said resonator whereby the resonant frequency of said resonator may be varied as desired.

16. An apparatus as claimed in claim 15 wherein said high pass coupling means comprises a coupling capacitor presenting a low impedance at the R.F. resonant frequency of said resonator means and a substantially higher impedance at a lower audio frequencies.

17. An apparatus as claimed in claim 14 wherein said coupling means couples together the separate cathode electrodes of said cathode follower means and said amplifier means.

18. Gyromagnetic spectrometer apparatus comprising radio frequency oscillator means for producing gyromagnetic resonance of a sample of matter disposed within a polarizing field and for detecting the characteristics of the sample of matter near resonance, limiter means coupled to said oscillator means for limiting the amplitude of the oscillations derived from said oscilator means, R.F. frequency discriminator means for comparing the frequency of said R.F. oscillator means with a standard fixed radio frequency to derive a low frequency control signal the phase and magnitude of which is a function of the sense and degree to which the oscillating radio frequency of said oscillator means varies from the standard radio frequency, low pass filter means for filtering out extraneously induced signals from the low frequency control signal, variable reactor means controlled by the control signal to vary the frequency of said oscillator means into coincidence with standard R.F. frequency, demodulator means coupled to said R.F. oscillator means for detecting amplitude modulation superimposed upon the R.F. frequency of oscillation of said oscillator means the amplitude modulation being a measure of the absorption of energy by the sample from said oscillator means at sample resonance, indicator means for displaying the amplitude modulation signal, and sweep generator means for modulating the polarizing field over the sample of matter to produce successive gyromagnetic resonance of the gyromagnetic bodies, if any, within the sample of matter.

19. Apparatus according to claim 18 including second indicator means for indicating and displaying the control signals to thereby obtain a measure of the dispersive characteristics of the sample of matter.

20. Gyromagnetic spectroscopy apparatus comprising first oscillator means having its frequency determinative resonant circuit closely coupled to a sample of matter such that resonance effects of the sample substantially tend to pull the resonant frequency of said first oscillator means, said sample being disposed within a polarizing field for producing gyromagnetic resonance of the gyromagnetic bodies, if any, within the sample of matter, said oscillator means also serving for detecting gyromagnetic resonances within the sample of matter, sweep generator means for producing a modulation of the D.C. polarizing field over the sample of matter to thereby produce successive gyromagnetic resonances of the gyromagnetic bodies within the sample of matter, second fixed frequency oscillator means for establishing a standard frequency, transmission line means electromagnetically coupling said first oscillator means and said second fixed oscillator means for allowing circulating reactive control currents substantially at the frequency of the standard frequency to flow between said first and said second oscillator means, diode detector means coupled to said transmission line means for detecting the circulating control currents flowing within said transmission line means between said first and said second oscillator means, and indicator means for indicating the output of said diode detector means thereby obtaining a measure of the dispersive characteristics of the sample of matter near resonance.

21. Apparatus for producing stable gyromagnetic resonance of a sample of matter disposed within a polarizing field region comprising: oscillator means having a frequency determinative resonant circuit closely coupled to the gyromagnetic resonance of the sample; such that resonance effects of the sample substantially tend to pull the frequency of said oscillator means, means forming an R.F. fixed frequency standard independent of the R.F. oscillator and gyromagnetic resonance sample of matter; means for comparing the R.F. oscillations of the oscillator to be the preselected R.F. standard frequency to obtain an electrical control signal for controlling the oscillations of the oscillator; means for applying the control signal to said oscillator means for correcting and stabilizing the R.F. oscillations thereof, thereby enhancing the stability of gyromagnetic resonance by minimizing random fluctuations in the oscillations of the oscillator means; and said oscillator means comprising, a high Q resonator means, forming the frequency determinative resonant circuit of said oscillator means, cathode follower means having an input terminal thereof coupled to said resonator means, amplifier means, said amplifier means and said cathode follower means having separate D.C. emitter circuits, essentially only high pass coupling means serving to couple the output of said cathode follower means to the input of said amplifier means whereby low frequency perturbations are not coupled to said amplifier means, and feedback means for feeding back a portion of the output of said amplifier means to the input of said cathode follower means in the proper phase to produce sustained oscillation of the oscillator means.

22. Apparatus as claimed in claim 21 including a sweep means for cyclically varying the conditions necessary for gyromagnetic resonance to thereby obtain successive gyromagnetic resonances of the gyromagnetic bodies within the sample of matter.

23. Apparatus according to claim 22 including indicator means for indication of the control signals to thereby obtain a measure of the dispersive characteristics of the sample of matter.

24. Apparatus as claimed in claim 23 wherein said R.F. frequency standard means comprises a frequency discriminator means, and said means for applying the control signals to said oscillator comprises a variable reactor means.

25. Apparatus according to claim 21 including a demodulator means coupled to said oscillator means for obtaining a signal in variable accordance with low frequency amplitude fluctuations, if any, of said oscillator means, and indicator means for indicating the low frequency amplitude fluctuations to thereby obtain an indication of the absorption characteristics of the sample of matter.

26. Apparatus as claimed in claim 21 wherein said means for applying the control signals to said oscillator means comprises a transmission line means.

27. Apparatus according to claim 26 including demodulator means coupled to said transmission line means for detecting the low frequency fluctuations in the control signals, and indicator means for displaying the magnitude and phase of the low frequency fluctuations of the control signals.

References Cited by the Examiner

UNITED STATES PATENTS

| | | | |
|---|---|---|---|
| 2,867,725 | 1/59 | Batchelor | 331—167 |
| 2,880,321 | 3/59 | Sontheimer | 331—36 |

OTHER REFERENCES

Tinkham: Physical Review, Vol. 97, No. 4, Feb. 15, 1955, pages 951-966 incl. (QC-1P4).

Beringer et al.: Physical Review, Vol. 95, No. 6, Sept. 15, 1954, pages 1474-1481 incl. (QC-1P4).

Hirshon et al.: The Review of Scientific Instruments, Vol. 26, No. 1, January 1955, pages 34-40 incl. (Q 187-R5).

Pound: The Review of Scientific Instruments, Vol. 17, No. 11, November 1946, pages 490-505 (Q-184-R5).

Ingram: Spectroscopy at Radio and Microwave Frequencies, Butterworths Scientific Publications, London, 1955, pages 102-105 incl. (QC 454-I5).

CHESTER L. JUSTUS, *Primary Examiner*.

MAYNARD R. WILBUR, *Examiner*.

UNITED STATES PATENT OFFICE
CERTIFICATE OF CORRECTION

Patent No. 3,209,242 September 28, 1965

William E. Bell

It is hereby certified that error appears in the above numbered patent requiring correction and that the said Letters Patent should read as corrected below.

Column 6, line 37, for "in" read -- an --; line 55, strike out "be"; column 7, line 71, after "with" insert -- the --; column 8, line 20, after "said" insert -- first --; same column 8, line 49, strike out "be".

Signed and sealed this 6th day of December 1966.

(SEAL)
Attest:

ERNEST W. SWIDER
Attesting Officer

EDWARD J. BRENNER
Commissioner of Patents